(12) United States Patent
Risley (10) Patent No.: US 6,401,904 B1
(45) Date of Patent: Jun. 11, 2002

(54) METHOD AND APPARATUS FOR SEPARATING OBJECTS

(75) Inventor: Robert F. Risley, Ellicott City, MD (US)

(73) Assignee: Materials Handling Systems, Inc., Elkridge, MD (US)

( * ) Notice: Subject to any disclaimer, the term of this patent is extended or adjusted under 35 U.S.C. 154(b) by 0 days.

(21) Appl. No.: 09/412,906

(22) Filed: Oct. 5, 1999

Related U.S. Application Data
(60) Provisional application No. 60/115,410, filed on Jan. 11, 1999.

(51) Int. Cl.⁷ .............................................. B65G 47/24
(52) U.S. Cl. ...................................... 198/380; 198/493
(58) Field of Search ................................ 198/380, 493, 198/400; 209/551, 576, 587, 577

(56) References Cited

U.S. PATENT DOCUMENTS

| | | | |
|---|---|---|---|
| 3,355,002 A | 11/1967 | Greck | 198/31 |
| 3,433,343 A | 3/1969 | Giulie | 193/31 |
| 3,552,537 A | 1/1971 | Vamvakas | 198/31 |
| 3,833,111 A * | 9/1974 | Sterling et al. | 198/380 |
| 3,848,746 A | 11/1974 | Bernardus van der winden | 198/31 |
| 4,130,480 A | 12/1978 | Loewenthal | 209/551 |
| 4,158,624 A * | 6/1979 | Ford et al. | 209/523 |
| 4,221,297 A | 9/1980 | Lopez et al. | 209/576 |
| 4,276,983 A | 7/1981 | Witmer | 209/587 |
| 4,469,218 A | 9/1984 | Cosse | 198/438 |
| 4,496,040 A | 1/1985 | Kronseder et al. | 198/434 |
| 4,946,046 A | 8/1990 | Affleck et al. | 209/580 |
| 5,135,101 A | 8/1992 | Dudley | 198/438 |
| 5,180,065 A | 1/1993 | Touge et al. | 209/577 |
| 5,339,964 A | 8/1994 | Gray et al. | 209/587 |

* cited by examiner

Primary Examiner—Kenneth W. Noland
(74) Attorney, Agent, or Firm—Thomas, Kayden, Horstemeyer & Risley, LLP (57) ABSTRACT

The present disclosure relates to a method and apparatus for separating objects. The apparatus typically includes a separation conveyor that forms a shallow peak within a pitched region upon which an object can be temporarily balanced, and at least two guide rails extending along the separation conveyor in a laterally spaced relationship. Upstream from the pitched region, the guide rails laterally support objects travelling along the separation conveyor. Within the pitched region, the guide rails are laterally spaced so as to permit lateral tipping of the objects when within the pitched region. At least one nozzle is positioned at a lateral position within the pitched region of the separation conveyor and is oriented so as to be capable of selectively ejecting a gentle burst of gas transversely across the separation conveyor to laterally tip an object balanced on the shallow peak to cause the object to slide under its own weight in a desired direction.

37 Claims, 5 Drawing Sheets

METHOD AND APPARATUS FOR SEPARATING OBJECTS

CROSS-REFERENCE TO RELATED INVENTION

This application claims the benefit of the filing date of U.S. Provisional Application Serial No. 60/115,410, filed Jan. 11, 1999.

FIELD OF THE INVENTION

The present disclosure relates generally to a method and apparatus for separating objects. More particularly, the invention relates to a method and apparatus for laning, sorting, and rejecting objects.

BACKGROUND OF THE INVENTION

When objects are conveyed from place to place, for example, in a production or packaging plant, it often is necessary to separate the conveyed objects for various reasons. For instance, it may be necessary to separate the objects into different lanes so that the objects can be acted upon by a relatively slow machine located downstream. Alternatively, it may be desired to sort the objects by any one of several object characteristics, e.g., color, fill level, etc. In other instances, it may be desired to separate defective objects from the acceptable objects. Accordingly, separating devices are called upon to perform the functions of laning, sorting, and/or rejecting objects that are being conveyed.

There have been several prior art devices designed to effect such object separation. One example is disclosed in U.S. Pat. No. 3,433,343, to Giulie. In this reference, Giulie describes a segregating device which uses mechanical, actuatable pistons that are used to physically push the objects being conveyed into one of two possible directions such that the defective objects can be separated from the acceptable ones. To aid in the segregation of these objects, the Giulie segregating device further uses a sheet metal ramp that is oriented at an angle with respect to the infeed conveyor so as to lead the objects in a downward direction away from the infeed conveyor. This ramp includes a central member constructed of a low friction plastic which comprises side walls that form ledges that are designed to guide the article in either of the two directions. Although ostensibly providing for object segregation, the Giulie design presents several disadvantages. First, a high degree of precision is required in operating the segregating device in that it is designed to physically push the object to one side or another with a piston rod. Accordingly, if the timing of actuation of either piston is off, or the length of stroke of the piston rod of either piston is off, device malfunction can occur. In addition, the use of a mechanical actuator such as a piston can require frequent maintenance and/or replacement of mechanical parts over the life of the device. Furthermore, due to the configuration of the ramp, there is a high probability of an object falling over while traveling down the ramp in that no support means beyond the central member are provided. Finally, it is clear from the design of the segregating device that objects of only very particular sizes and shapes can be segregated with the device.

Another device for separating objects is described in U.S. Pat. No. 3,552,537, to Vamvakas. In this patent, Vamvakas discloses a conveyor system comprising an infeed conveyor which feeds two central conveyors arranged in parallel. The first of these central conveyors is a relatively slow moving conveyor while the second is a relatively fast moving conveyor. Positioned in between these two conveyors is a center rail that protrudes above the surface of the two parallel conveyors. As objects are transferred from the infeed conveyor to the central conveyors, some of the objects remain on the slow conveyor while others are forced by other incoming objects beyond the slow conveyor to be swept away by the fast conveyor. The center rail aids in the separation of the objects by causing objects traveling along both the slow and fast conveyors to tilt either toward the slow conveyor or the fast conveyor. Although capable of separating the objects into different lanes, the Vamvakas conveyor system also presents several disadvantages. First, calibration of the conveyor system can be difficult in that the correct speeds must be chosen for the infeed conveyor, the relatively slow conveyor, and the relatively fast conveyor such that generally equal distribution of the objects is obtained. In addition, proper functioning of the conveyor system requires that the objects come into contact with each other. As is known in the art, this object interaction can cause crowding and jams which often require shut-down of the conveyor system and attendant delays. Moreover, the center rail tends to slow down operation of the conveyor system such that, even when the correct speed ratios are selected, high-speed operation of the conveyor system is difficult to maintain. Finally, the conveyor system disclosed by Vamvakas only can be used to lane the objects in that separation of the objects is random and not selective. Accordingly, the Vamvakas conveyor system cannot be used to sort and/or reject objects.

A further device for separating objects is disclosed in U.S. Pat. No. 4,469,218 to Cossé. Similar in design to the segregating device disclosed by Giulie, the Cossé separating device comprises an infeed conveyor and a ramp that slopes downwardly therefrom. The ramp is provided with a separating barrier that, similar to the central member of Giulie's ramp, aids in the separation of the objects. Instead of using an actuatable piston, however, Cossé uses compressed air to force the objects in the desired directions. In particular, Cossé uses a compressed air source that is connected to a delivery pipe that is positioned just upstream of the meeting point of the infeed conveyor and the ramp. The pipe is provided with two outlets that face downwardly toward the objects transported thereunder. To control the sequence in which the compressed air is delivered to the objects, a drum-shaped distributor is disposed about the pipe which has a plurality of elongated apertures positioned in various positions along the periphery of the distributor. During operation, the distributor is rotated about the pipe such that the compressed air leaving the pipe through the outlets only reaches an object when one of the outlets is aligned with a drum aperture. Although the Cossé device can be considered an improvement over the Giulie segregating device in that no mechanical actuators are used to separate the objects, the Cossé separating device cannot be used to selectively separate the objects to obtain either a sorting function or a rejecting function because the blasts of compressed air directed towards the objects are controlled only by the configuration and rotation speed of the distributor. Therefore, the Cossé separating device can only divide the objects into different lanes. In addition, the device must be very carefully synchronized such that the bursts of compressed air reach the conveyor when the objects are positioned under the distributor.

From the foregoing, it can be appreciated that it would be desirable to have a separating device that is capable of selectively laning, sorting, and rejecting objects which is flexible, fast, efficient, and which uses a minimum of moving parts.

SUMMARY OF THE INVENTION

The present disclosure relates to a method and apparatus for separating objects. The apparatus typically includes a separation conveyor that forms a shallow peak within a pitched region of the separation conveyor upon which an object travelling along the separation conveyor can be temporarily balanced. The apparatus further includes at least two guide rails extending along the separation conveyor in a laterally spaced relationship. Upstream from the pitched region, the guide rails laterally support objects travelling along the separation conveyor. Within the pitched region, the guide rails are laterally spaced so as to permit lateral displacement of the objects when within the pitched region. At least one nozzle is positioned at a lateral position within the pitched region of the separation conveyor and is oriented so as to be capable of selectively ejecting a burst of gas transversely across the separation conveyor to tip an object balanced on the shallow peak so as to cause the object to be laterally displaced.

In a preferred arrangement, the apparatus further includes at least one sensing device positioned adjacent the at least one nozzle which is electronically connected to a control system which controls activation of the at least one nozzle in response to information sensed by the sensing device. Arranged in this manner, the apparatus can sense either the mere presence of an object or certain predetermined characteristics of the object to determine when the at least one nozzle should be activated to tip the object in a desired direction.

With the herein described apparatus, objects can be selectively directed into separate lanes, sorted into different groups having shared characteristics, or rejected when sensed to be inadequate for any reason.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
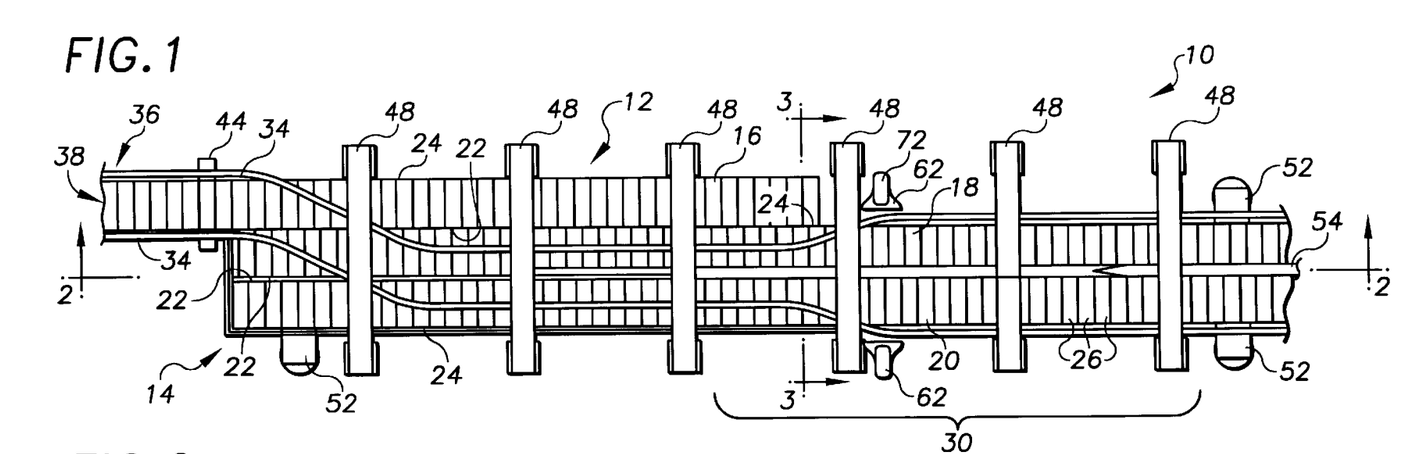
FIG. 1 is a plan view of a first embodiment of an object separating device.
Figure 2:
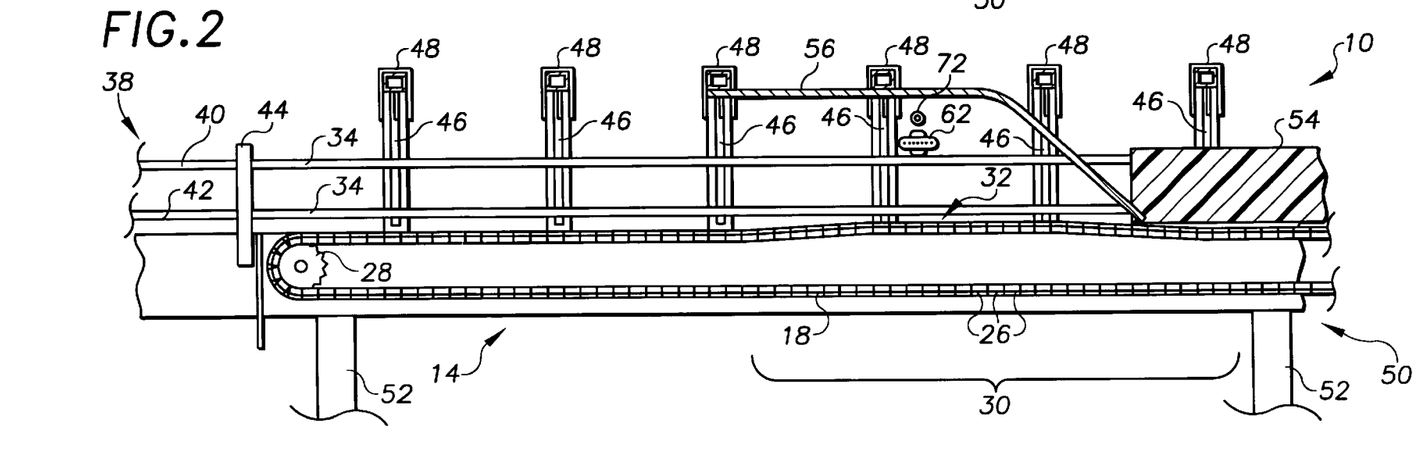
FIG. 2 is a cross-sectional view of the object separating device shown in FIG. 1 taken along line 2—2.
Figure 3:
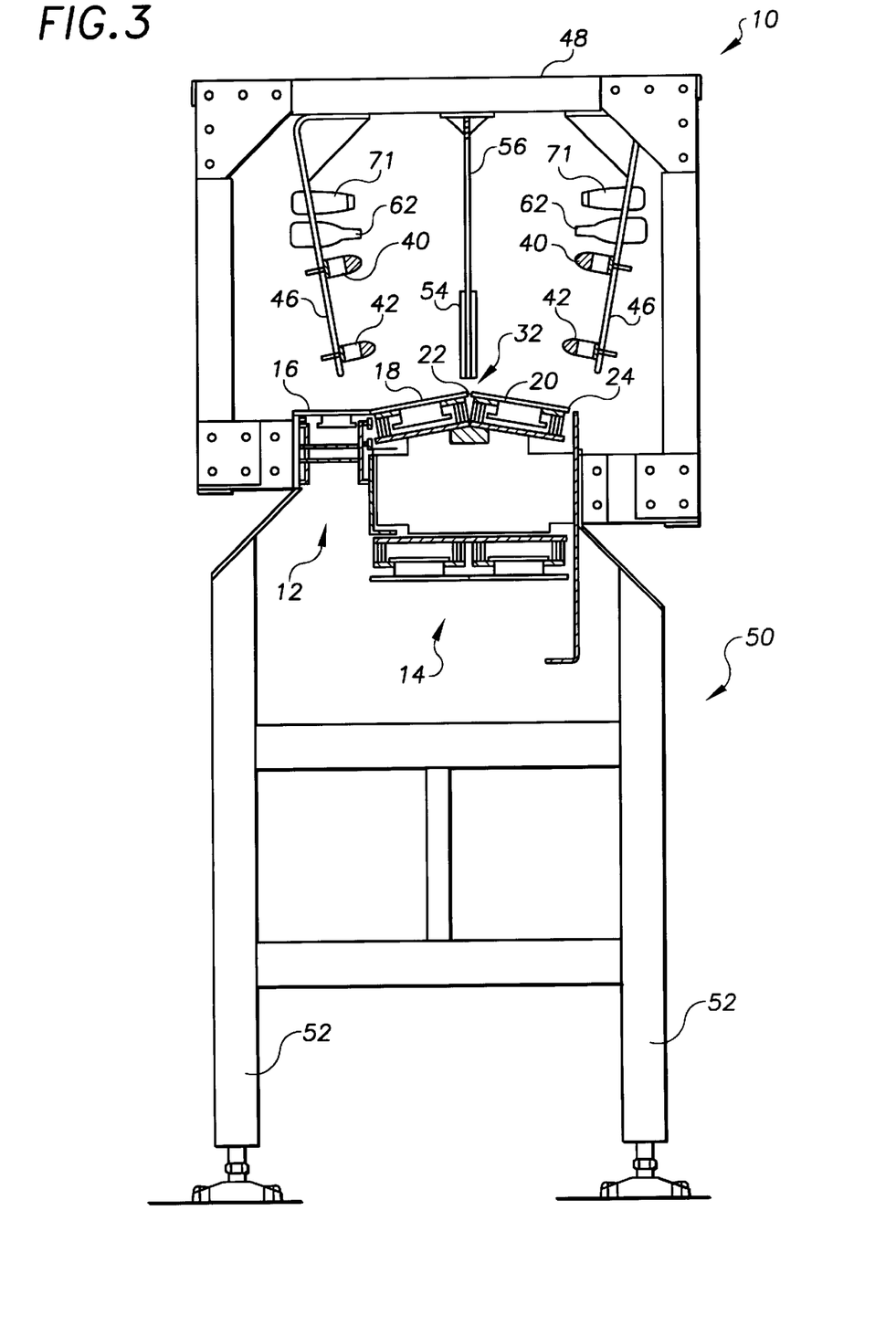
FIG. 3 is a cross-sectional view of the object separating device shown in FIG. 1 taken along line 3—3.

Referring now in more detail to the drawings, in which like numerals indicate corresponding parts throughout the several views, FIGS. 1–3 illustrate a first embodiment of an object separating device 10. As indicated most clearly in FIG. 1, the object separating device 10 typically comprises an infeed conveyor 12 and a separation conveyor 14 which are arranged in parallel with one another. The infeed conveyor 12 includes a conveyor belt 16 while the separation conveyor 14 includes a first or left conveyor belt 18 and a second or right conveyor belt 20. Each of the conveyor belts 16–20 comprises an inside edge 22 and an outside edge 24. Preferably, the conveyor belts 16–20 are arranged closely together as illustrated in FIG. 1 so as to minimize the gaps therebetween. By way of example, the infeed conveyor belt 16 can be separated from the left separation conveyor belt 18 by a distance of no more than approximately $\frac{1}{16}$ inches and the left separation belt 18 can be separated from the right separation conveyor belt 20 by a distance of no more than approximately $\frac{1}{8}$ inches.

In a preferred arrangement, each of the conveyor belts 16–20 comprises a plurality of conveyor plates 26 that are mechanically linked with each other so as to form endless chains. Although conveyor plates are preferred, it will be understood by those having ordinary skill in the art that one or more of the conveyor belts could take the form of substantially any type of conveyor belt known in the art. Normally, each of the conveyor belts is supported by one or more sprockets 28 such as that indicated in FIG. 2. With reference to FIGS. 1 and 2, the infeed conveyor belt 16, the left separation conveyor belt 18, and the right separation belt 20 are oriented within the same plane, at least adjacent the front end of the separation conveyor 14, so that objects can be transferred smoothly from one conveyor belt to the other. However, as indicated most clearly in FIG. 2, the first and second conveyor belts 18 and 20 gradually pitch upwardly along a pitched region 30 such that, as shown in FIG. 3, the inside edges 22 of the separation conveyor belts 18, 20 are raised above the outside edges 24 of these conveyor belts. By way of example, each separation conveyor belt 18, 20 can be pitched to a maximum angle of approximately 10 degrees. Arranged in this manner, the left and right separation conveyor belts 18 and 20 form a shallow peak 32, the purpose for which is discussed hereinafter.

With reference back to FIG. 1, extending along each conveyor 12, 14 is a plurality of guide rails 34 typically having a high lubricity factor. The guide rails 34 normally are arranged in a first or left set 36 and a second or right set 38. As indicated in FIGS. 2 and 3, each set 36, 38 of guide rails 34 typically comprises an upper rail 40 and a lower rail 42. Along the infeed conveyor 12, the left and right sets 36 and 38 of guide rails 34 are aligned with the inside and outside edges 22 and 24 of the infeed conveyor belt 16 and are supported in this configuration by support brackets 44. However, as illustrated in FIG. 1, the left and right sets 36 and 38 of guide rails 34 gradually cross the infeed conveyor belt 16 so as to ultimately align above the left and right separation conveyor belts 18 and 20 equidistant from the inside edges of the separation conveyor belts. Adjacent the pitched region 30 of the separation conveyor 14, the left and rights sets 36 and 38 of guide rails 34 diverge from each other so as to align with the outer edges 24 of the separation conveyor belts 18, 20. Typically the left and right sets 36 and 38 of guide rails 34 are suspended over the separation conveyor 14 with a plurality of hanging brackets 46 which are supported by a plurality of structural members 48. As indicated in FIG. 3, the structural members 48 can attach to a support frame 50 which also supports the infeed conveyor 12 and the separation conveyor 14 with a plurality of support legs 52.

With further reference to FIG. 3, the hanging brackets 46 extend downwardly from the structural members 48 at an inward angle along the pitched region 30 of the separation conveyor 14 such that the upper guide rails 40 are spaced apart from each other a greater distance than the lower guide rails 42. Arranged in this manner, an object traveling along either the left or right separation conveyor belt 18 or 20 will be supported by both the upper and lower rails 40 and 42 despite being in a pitched orientation. In addition to the hanging brackets 46, the structural members 48 also can support a divider 54 which is positioned between the left and right separation conveyor belts 18 and 20 as indicated in FIG. 1. Typically, the divider 54 is hung from a support arm 56 which is connected to one or more of the structural members 48.

Figure 4:
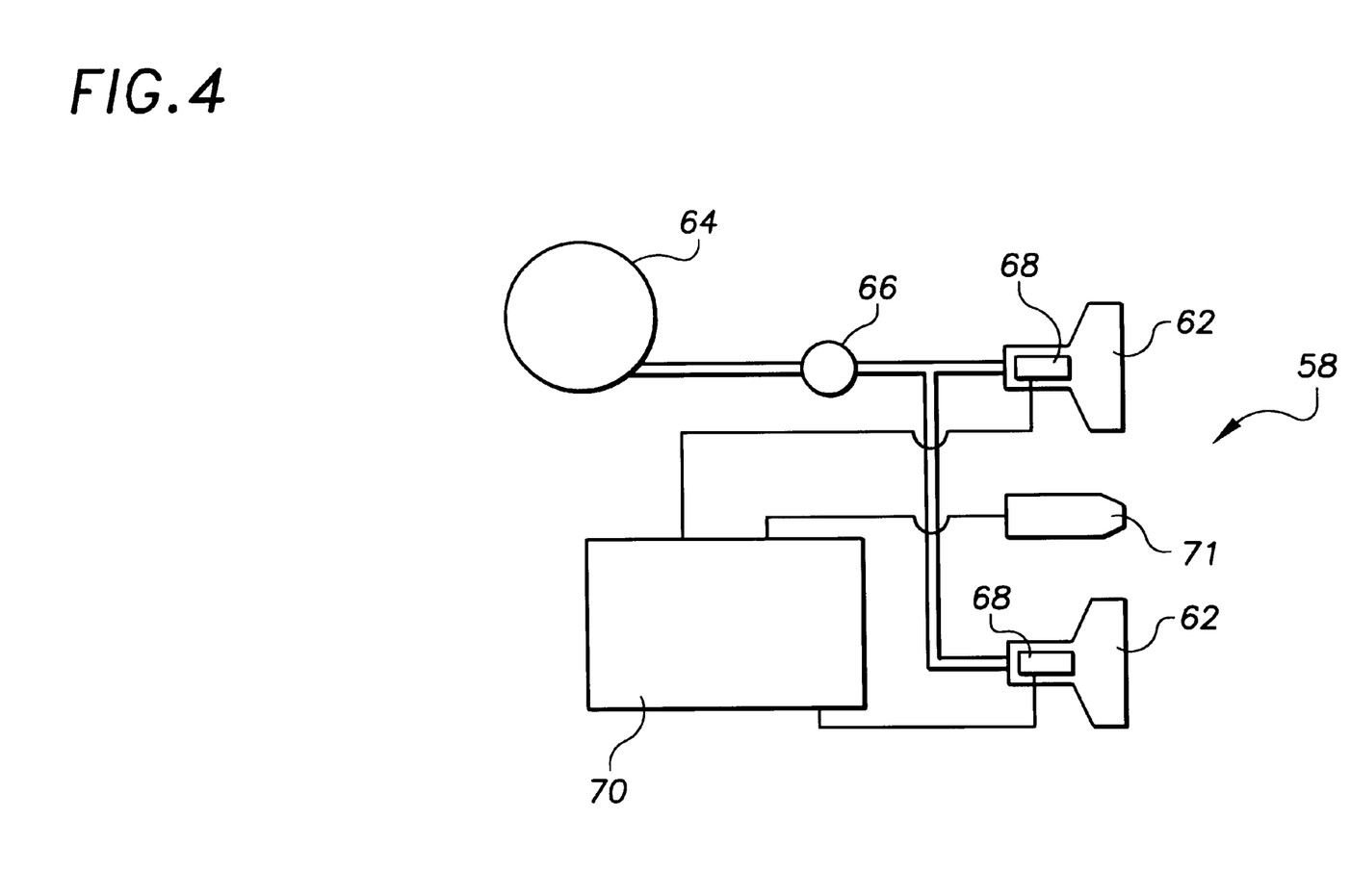
FIG. 4 is a schematic view of a pneumatic impulse system used in the object separating device shown in FIGS. 1–3.

As is schematically illustrated in FIG. 4, the object separating device 10 typically further comprises an pneumatic impulse system 58 which, together with the shallow peak 32 formed by the left and right separation conveyor belts 18 and 20, influences the objects traveling along the separation conveyor 14 to cause the objects to selectively be laterally displaced to the left or to the right. As indicated in this figure, the pneumatic impulse system 58 comprises at least one nozzle 62 that is positioned just downstream of the point at which the guide rails 34 diverge from each other within the pitched region 30 of the separation conveyor 14 (see FIGS. 1–2). Preferably, one such nozzle 62 is positioned adjacent the guide rails 34 of each guide rail set 36, 38 such that one nozzle is positioned to each side of objects travelling down the separation conveyor 14. Each nozzle 62 is in fluid communication with a source 64 of pressurized gas. By way of example, this source 64 of pressurized gas can comprise a pressurized air tank or an air compressor. To control the pressure of the gas transported to the nozzles 62, a regulator 66 normally is positioned intermediate the source 64 of pressurized gas and the nozzle(s).

In a preferred arrangement, the nozzle 62 includes a solenoid valve 68 which is electronically connected to a control system 70 which controls its actuation. In particular, the control system 70 controls the actuation of the solenoid valves 68 of each nozzle 62 to allow pressurized gas from the source 64 of pressurized gas to be ejected in a transverse direction across the separation conveyor 14. By way of example, the control system 70 can comprise a programmed logic computer that sends signals to the solenoid valves 68 in response to certain predetermined criteria. Typically, the control system 70 sends its signals in response to data received by one or more sensing devices 71 that is/are positioned adjacent the nozzles 62 along the separation conveyor 14. This sensing device(s) 71 can be configured so as to sense predetermined conditions about the objects traveling down the separation conveyor 14 so as to indicate in what direction the object is to be placed. For instance, the sensing device(s) 71 can sense conditions such as the mere presence of an object when the control system 70 is configured to alternatingly position the objects into separate lanes, or can be configured to sense certain conditions of the objects such as color, presence/absence of a label, fill level, and the like, so as to signal the control system 70 how the objects should be sorted, or if applicable, which objects should be rejected.

Figure 5:
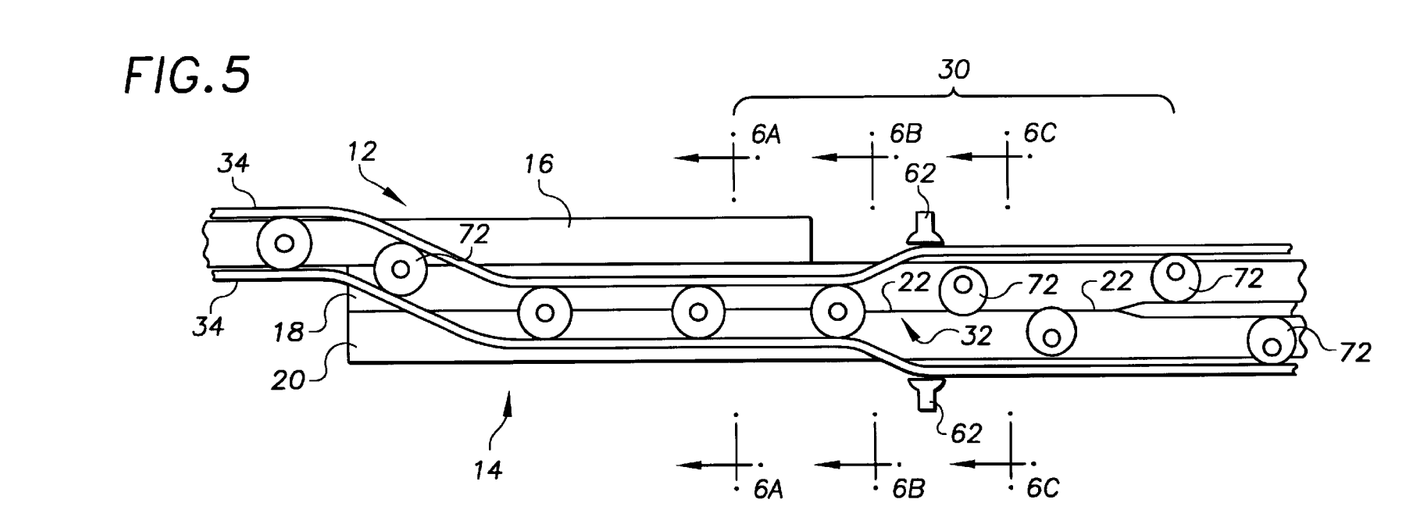
FIG. 5 is a plan view showing a schematic layout of the object separating device shown in FIGS. 1–3.
Figure 6A:
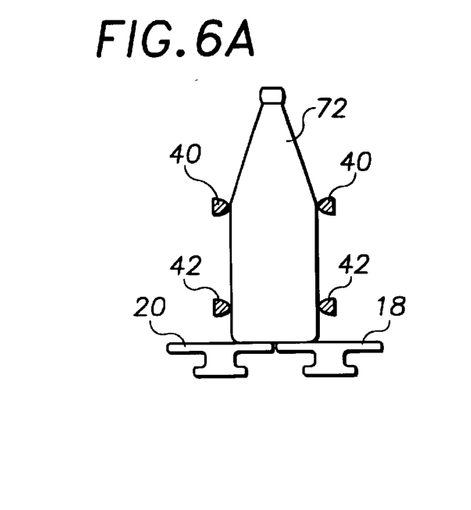
FIG. 6A is a transverse sectional view taken along line 6A—6A in FIG. 5.
Figure 6B:
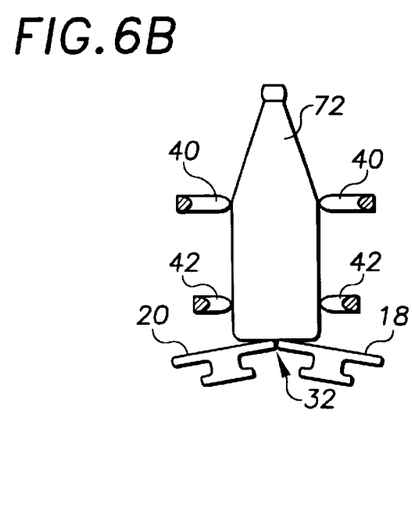
FIG. 6B is a transverse sectional view taken along line 6B—6B in FIG. 5.

The primary structural components of the object separating device 10 having been described, operation of the device will be discussed with reference to FIGS. 5 and 6A–6C. FIG. 5 schematically illustrates the progression of a plurality of objects 72 along the infeed conveyor 12 and the separation conveyor 14. As indicated in this figure, each object 72, for instance, a liquid container, travels along the infeed conveyor belt 16 guided at each side by the guide rails 34. As the guide rails 34 cross the infeed conveyor belt 16 to align over to the left and right separation conveyor belts 18 and 20, the objects 72 are laterally displaced so as to become positioned over the inside edges 22 of the separation conveyor belts. Initially, the left and right separation conveyor belts 18 and 20 are arranged in the same plane as indicated in FIG. 6A. As the object 72 continues along the separation conveyor 14, however, the left and right separation conveyor belts 18 and 20 become upwardly pitched such that the object 72, while supported by the guide rails 34, balances on the shallow peak 32 formed by the two separation conveyor belts when within the pitched region 30, as indicated in FIG. 6B. As forward movement continues, however, the guide rails 34 diverge from the object 72 as indicated in FIG. 6B so that the object 72 is temporarily balanced on the shallow peak 32 without the lateral support of the guide rails 34, the object 34 is unstable and therefore can easily be tipped to the left or the right. At this point, the sensing device (not shown) senses a predetermined characteristic of the object and electronically transmits this information to the control system 70 which, in turn, sends an electronic actuation signal to the solenoid valve 68 of one of the two nozzles 62.

Figure 6C:
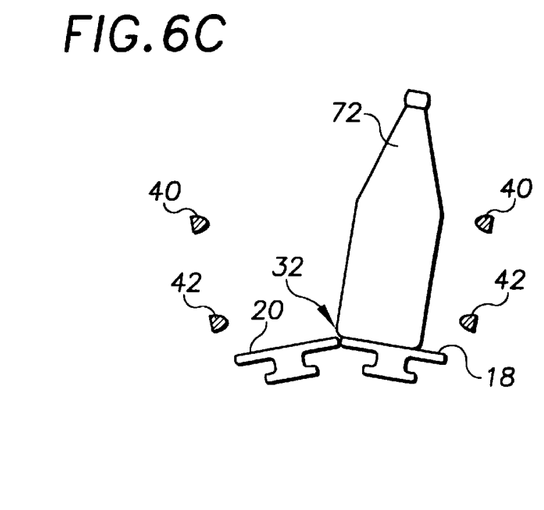
FIG. 6C is a transverse sectional view taken along line 6C—6C in FIG. 5.

Upon receiving this signal, the solenoid valve 66 of the particular air nozzle 62 opens to allow a gentle burst of pressurized gas, typically air, out of the air nozzle 62 and onto the object to influence the direction in which it tips from the shallow peak 32. Due to the relative instability of the object 72 while balanced upon the peak 32 without the support of the guide rails 34 when this burst is received, only a relatively small amount of force directed at the top portion of the object is required to effect such tipping of the object. By way of example, a burst of gas of approximately 20 psi–40 psi for a duration of approximately 40 seconds normally is sufficient to tip objects as heavy as 4.5 pounds. After receiving this burst of gas, the object 72 tips in the desired direction and, under its own weight, gently slides downwardly along the separation conveyor belt under the force of gravity as indicated in FIG. 6C and eventually comes back into contact with one of the sets 36, 38 of guide rails 34. As will be appreciated by those having skill in the art, the lateral position and orientation of these guide rails 34 adjacent the separation point is important. In particular, the guide rails 34 must be configured so as to catch the object as it slides off from the shallow peak 32 in a gentle manner such that the object does not bounce back toward the peak upon contacting the guide rail or, if open, spill its contents upon making this contact. Accordingly, the lateral positioning and orientation of the guide rails must be selected in view of the weight, profile, and size of the object to ensure that gentle "catching" of the object is obtained. Such positioning and orientation can be determined by those having ordinary skill in the art through normal experimentation. To ensure proper operation, the divider 54 can complete the separation process if the object is not wholly transferred to the desired conveyor belt by the time the object reaches the rear end of the separation conveyor 14.

Operating in this manner, the object separating device 10 can selectively position objects onto one of the two separation conveyor belts 18, 20 in response to sensed object conditions. Accordingly, the object separating device described herein can be used to separate the objects into separate lanes, sort the objects into different groups having shared characteristics, or can reject objects that are sensed to be inadequate for any reason. In that the object separating device 10 utilizes the objects' own weight and the force of gravity to effect this separation, the device can be used to separate not only containers such as those shown in FIG. 5 and FIGS. 6A–6C, but further can be used to separate cans, plastic bottles, glass bottles, boxes, envelopes, bags, and substantially any other form of product container. Because there are no moving parts which come into contact with the objects, object separation can be accomplished at very high speeds with very little noise and without the need for precise calibration. As will be appreciated by persons having ordinary skill in the art, the only speed limitation upon the separating device is the speed with which the nozzle solenoid can be cycled. Moreover, the speed of the separation conveyor can be adjusted with the conveyor online without malfunction and/or jamming in that there is no direct correlation between conveyor speed and solenoid cycling. Further advantages of the device include simplicity of design, low cost of manufacture, and low maintenance due to the absence of intricate moving parts. Additionally, due to the gentle operation of the apparatus, open containers can be separated without spillage, and separation can be effected even when the objects are in a closely spaced configuration.

Figure 7:
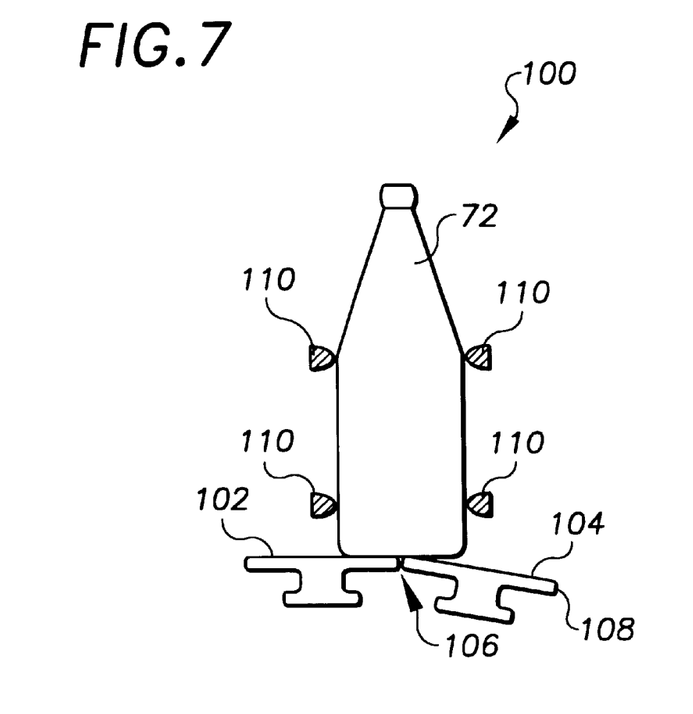
FIG. 7 is a schematic transverse sectional view of a second embodiment of an object separating device.
Figure 8:
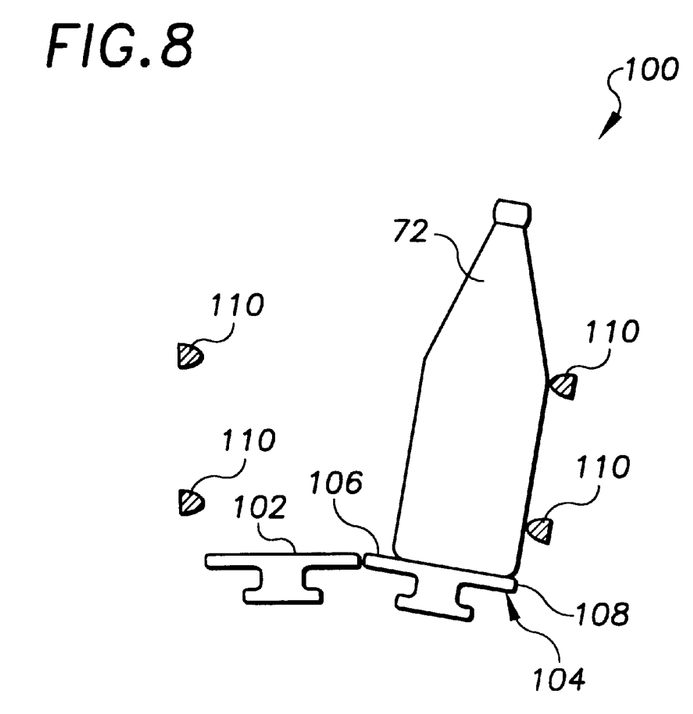
FIG. 8 is a schematic transverse sectional view of the device shown in FIG. 7 taken at a point downstream of that shown in FIG. 7.

FIGS. 6 and 7 illustrate a second embodiment 100 of an object separating device. In particular, these figures illustrate the separating conveyor belt and guide rail orientations (viewed from a downstream position) considered well-suited for removing defective objects from a line of objects. As indicated in FIG. 7, a right separator conveyor belt 102 is oriented horizontally, while a left separation conveyor belt 104 is pitched such that its inside edge 106 is higher than its outside edge 108. In use, an object 72 travels along the center of the two conveyor belts 102, 104, balanced such that the objects travelling thereon are oriented in an upright orientation. As forward movement of the object continues, the guide rails 110 diverge from each other such that the object 72 can be tipped onto the left separation conveyor belt 104 under the influence of an appropriately placed nozzle (not shown) if it is determined that the object is defective in some manner. Operating in this manner, non-defective objects will travel along the left and right separation conveyor belts 102 and 104 undisturbed while defective objects are quickly separated from the line with a gentle burst of gas. The defective objects then either can be discarded or can be rerouted to a separate station so that the defects can be cured and the object returned back to the main operations line.

While preferred embodiments of the invention have been disclosed in detail in the foregoing description and drawings, it will be understood by those skilled in the art that variations and modifications thereof can be made without departing from the spirit and scope of the invention as set forth in the following claims. It will be understood that a plurality of separating devices can be connected in series and/or parallel to further separate the objects into a plurality of different lanes, if desired. Moreover, although a "separation conveyor" has been described and illustrated herein, it is to be understood that a separate separation conveyor is not per se, necessary. Emphasis instead is placed upon the provision of a pitched region in which an object can be balanced upon a peak, the facilitation of an unstable balanced condition of the object within the pitched region, and the application of a gentle impulsive force to tip the object from the peak to move it in a desired direction.

What is claimed is:

1. An object separating device, comprising:
   an infeed conveyor;
   a separation conveyor connected to said infeed conveyor, said separation conveyor forming a shallow peak within a pitched region of said separation conveyor, wherein objects travelling along said pitched region travel along said shallow peak and are balanced thereon; and
   a pneumatic impulse system comprising at least one nozzle positioned within said pitched region of said separation conveyor, said at least one nozzle being selectively actuatable to eject a burst of gas transverse to the travel direction of the objects so as to tip the objects off said shallow peak and displace them laterally.

2. The device of claim 1, wherein said infeed conveyor comprises an infeed conveyor belt and said separation conveyor comprises first and second separation conveyor belts, said separation conveyor belts being arranged directly adjacent each other and aligned in parallel.

3. The device of claim 2, wherein said shallow peak is formed by said first and second separation conveyor belts which are upwardly pitched within said pitched region of said separation conveyor.

4. The device of claim 3, wherein said first and second separation conveyor belts each have inside and outside edges and wherein said inside edges of each separation conveyor belt form said shallow peak.

5. The device of claim 1, wherein said pneumatic impulse system comprises two nozzles, one nozzle positioned at each side of said separation conveyor so as to eject gas transversely across said separation conveyor when activated.

6. The device of claim 1, wherein said pneumatic impulse system comprises a control system that actuates said at least one nozzle in response to predetermined criteria.

7. The device of claim 1, wherein said pneumatic impulse system comprises at least one sensor positioned adjacent said at least one nozzle, said sensor being capable of sensing at least one physical characteristic of objects travelling along said separation conveyor.

8. The device of claim 1, wherein said pneumatic impulse system comprises a source of compressed air in fluid communication with said at least one nozzle.

9. The device of claim 1, wherein said at least one nozzle is activated by a solenoid valve.

10. The device of claim 1, further comprising a plurality of guide rails that extend along said infeed conveyor and said separation conveyor to provide lateral support to objects travelling along said conveyors.

11. The device of claim 10, wherein said guide rails are arranged in first and second sets, wherein each set includes at least one guide rail.

12. The device of claim 11, wherein said first and second sets diverge from each other along said pitched region of said separation conveyor such that objects balanced upon said shallow peak can be tipped off of said shallow peak in response to an impulse force.

13. An object separating device, comprising:
   an infeed conveyor having an infeed conveyor belt;
   a separation conveyor connected to said infeed conveyor, said separation conveyor having a first separation conveyor belt and a second separation conveyor belt, said separation belts together forming a shallow peak within a pitched region of said separation conveyor so that an object travelling along said separation conveyor can be temporarily balanced on said shallow peak;
   at least two guide rails extending along said infeed conveyor and said separation conveyor, said guide rails laterally spaced from each other so as to laterally support objects travelling along said conveyor belts upstream of said pitched region and being laterally spaced within said pitched region so as to permit lateral tipping of the objects; and a pneumatic impulse system comprising a nozzle positioned at each side of said separation conveyor within said pitched region of said separation conveyor, said nozzles being oriented so as to eject a gentle burst of gas transversely across said separation conveyor when actuated by said pneumatic impulse system.

14. The device of claim 13, wherein said pneumatic impulse system comprises a control system that actuates said at least one nozzle in response to predetermined criteria.

15. The device of claim 13, wherein said pneumatic impulse system comprises at least one sensor positioned adjacent at least one of said nozzles, said sensor being capable of sensing at least one physical characteristic of objects travelling along said separation conveyor.

16. The device of claim 13, wherein said pneumatic impulse system comprises a source of compressed air in fluid communication with said at least one nozzle.

17. The device of claim 13, wherein said at least one nozzle is activated by a solenoid valve.

18. A separation conveyor, comprising:
   first and second separation conveyor belts arranged directly adjacent each other in parallel, each of said separation conveyor belts having an inside edge and an outside edge, said conveyor belts being pitched such that said inside edges of said pitched conveyor belts are raised above said outside edges of said pitched conveyor belts, said inside edges of said separation conveyor belts together forming a shallow peak within a pitched region of said separation conveyor upon which an object travelling along said separation conveyor can be temporarily balanced;
   at least two guide rails extending along said separation conveyor, said guide rails being laterally spaced from each other so as to laterally support objects travelling along said separation conveyor belts upstream of said pitched region and being laterally spaced within said pitched region so as to permit lateral tipping of the objects within said pitched region; and
   at least one nozzle positioned laterally of at least one of said separation conveyor belts and oriented so as to be capable of ejecting a gentle burst of gas transversely across said separation conveyor to laterally displace an object balanced on said shallow peak.

19. The conveyor of claim 18, further comprising at least one sensor positioned adjacent said at least one nozzle, said at least one sensor being capable of sensing at least one physical characteristic of objects travelling along said separation conveyor.

20. A method of separating objects, comprising:
   laterally supporting an object travelling along a separation conveyor;
   balancing the object on a shallow peak formed along a pitched region of the separation conveyor;
   temporarily removing the lateral support of the object so that the object can be laterally tipped from its position upon the shallow peak; and
   applying a gentle burst of gas transversely across the separation conveyor so as to impinge upon the object when in the pitched region to laterally tip the object off from the shallow peak.

21. The method of claim 20, wherein the presence of the object in the pitched region is sensed by a sensing device.

22. The method of claim 20, wherein the burst of gas is applied to the object in response to an object characteristic sensed by a sensing device.

23. The method of claim 20, wherein the burst of gas is applied to an upper portion of the object.

24. An object separating device, comprising:
   a separation conveyor forming a shallow peak along which the objects can be transported; and
   a pneumatic impulse system comprising at least one nozzle that is selectively actuatable to eject a gentle burst of gas transverse to the travel direction of the objects so as cause selected objects to tip off of said shallow peak and be displaced in a transverse direction.

25. The device of claim 24, wherein said shallow peak is formed by first and second conveyor belts of said separation conveyor.

26. The device of claim 25, wherein inside edges of each conveyor belt form said shallow peak.

27. The device of claim 24, wherein said pneumatic impulse system comprises a control system that actuates said at least one nozzle in response to predetermined criteria.

28. The device of claim 24, wherein said pneumatic impulse system comprises at least one sensor positioned adjacent said at least one nozzle, said sensor being capable of sensing at least one physical characteristic of objects travelling along said separation conveyor.

29. The device of claim 24, wherein said at least one nozzle is activated by a solenoid valve.

30. The device of claim 24, further comprising guide rails that extend along said separation conveyor and provide lateral support to objects travelling along said conveyor.

31. The device of claim 30, wherein said guide rails are arranged in first and second sets that diverge from each other adjacent said shallow peak of said separation conveyor such that objects balanced upon said shallow peak can be tipped off of said shallow peak in response to an impulse force.

32. An object separating device, comprising:
   a separation conveyor adapted to transport objects in a nearly unbalanced state; and
   a pneumatic impulse system comprising at least one nozzle that is selectively actuatable to eject a gentle burst of gas transverse to the travel direction of the objects so as cause selected objects to become unbalanced and be displaced in a transverse direction.

33. The device of claim 32, wherein said separation conveyor comprises a horizontal conveyor belt on which the objects can be balanced and an angled conveyor belt that is declined away from said horizontal conveyor.

34. The device of claim 33, wherein said conveyor belts are parallel to each other and have inner edges that are positioned directly adjacent to each other.

35. A method of separating objects, comprising:
   balancing an object on a separation conveyor such that the object is nearly unbalanced; and
   applying a gentle burst of gas transversely across the separation conveyor so as to impinge upon the object to cause the object to become unbalanced and tip in a transverse direction.

36. The method of claim 35, wherein the object is balanced adjacent the edge of a horizontally oriented conveyor belt.

37. The method of claim 36, wherein the object is tipped onto a declined conveyor belt adjacent the horizontally oriented conveyor belt.

* * * * *